US006802008B1

(12) United States Patent  
Ikefuji et al.

(10) Patent No.: US 6,802,008 B1  
(45) Date of Patent: Oct. 5, 2004

(54) IC CARD AND IC CHIP MODULE

(75) Inventors: Yoshihiro Ikefuji, Kyoto (JP); Hiroharu Okada, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/423,293

(22) PCT Filed: Mar. 11, 1998

(86) PCT No.: PCT/JP98/01023

§ 371 (c)(1),  
(2), (4) Date: Nov. 5, 1999

(87) PCT Pub. No.: WO98/53402

PCT Pub. Date: Nov. 26, 1998

(30) Foreign Application Priority Data

May 19, 1997 (JP) .............................................. 9-128304

(51) Int. Cl.[7] .......................... G06F 11/30; G06K 19/02
(52) U.S. Cl. ............................. 713/200; 902/2; 902/26; 902/28; 705/64; 235/375; 235/487
(58) Field of Search ................................. 713/200, 193, 713/194; 380/52, 3, 4; 711/164, 163; 235/382, 375, 380, 487, 492; 327/603; 902/2, 26, 27, 28, 29; 705/64; 340/825, 5.1, 5.2, 5.74

(56) References Cited

U.S. PATENT DOCUMENTS

| | | | |
|---|---|---|---|
| 4,860,351 A | 8/1989 | Weingart | ...................... 713/194 |
| 5,239,166 A | * 8/1993 | Graves | ........................ 235/380 |
| 5,377,343 A | 12/1994 | Yaezawa | ...................... 711/164 |
| 5,457,747 A | * 10/1995 | Drexler et al. | .............. 713/186 |
| 5,742,756 A | * 4/1998 | Dillaway et al. | ........... 713/200 |
| 5,892,211 A | * 4/1999 | Davis et al. | ................. 235/380 |
| 6,031,912 A | * 2/2000 | Moulart et al. | ............... 380/44 |

FOREIGN PATENT DOCUMENTS

| | | |
|---|---|---|
| EP | 0510434 A2 | 10/1992 |
| JP | 3 63-124155 | 5/1988 |
| JP | 7 63-237144 | 10/1988 |
| JP | 2-71345 | 3/1990 |
| JP | 4 4-76749 | 3/1992 |
| JP | 5-158800 | 6/1993 |
| JP | 1 5-258129 | 10/1993 |
| JP | 5 5-282472 | 10/1993 |
| JP | 6 7-219853 | 8/1995 |
| JP | 2 8-115267 | 5/1996 |

* cited by examiner

Primary Examiner—Emmanuel L. Moise  
(74) Attorney, Agent, or Firm—Arent Fox PLLC

(57) ABSTRACT

In an IC card 30 is sealed an IC chip 70 provided with an exposure sensor 84. When exposure sensor 84 detects that IC card 30 has been opened, exposure sensor 84 outputs an exposure detection signal to a CPU 76. In response to the exposure detection signal, CPU 76 provides a predetermined operation, such as erasure of data in a non-volatile memory 78. As such, the data in non-volatile memory 78 cannot be obtained if IC card 30 is improperly opened to check the data in non-volatile memory 78. Thus the IC card can obtain an enhanced data security.

14 Claims, 14 Drawing Sheets

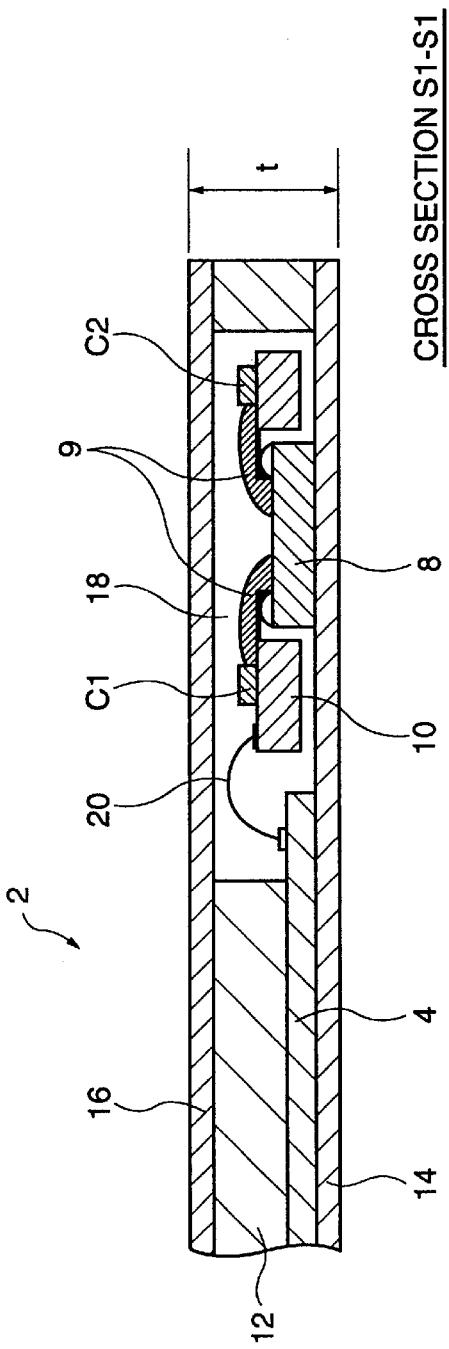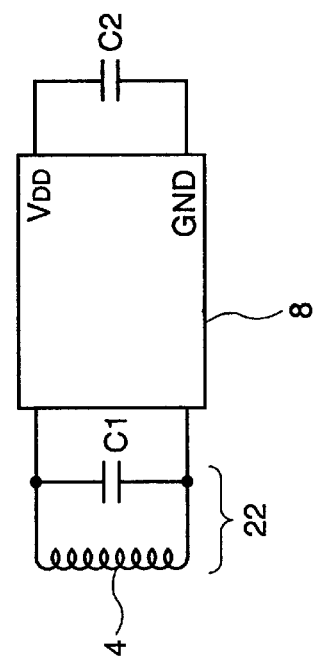

IC CARD AND IC CHIP MODULE

TECHNICAL FIELD

The present invention relates to IC cards and IC chip modules and in particular to IC cards and IC chip modules with enhanced security.

BACKGROUND ART

A communication system employing a non-contact IC card is used for automatic ticket-gates of ski lifts, railroads and the like, automatic freight-sorting, and the like. FIG. 15 is a perspective view showing one example of a conventional non-contact IC card. An IC card 2 shown in FIG. 15 is a 1-coil IC card comprised of a coil 4 used as an antenna, capacitors C1 and C2, and an IC chip 8.

Capacitors C1, C2 and IC chip 8 are mounted to a synthetic resin substrate in the form of a film. The substrate with capacitors C1, C2 and IC chip 8 mounted thereto is referred to as a tape automated bonding (tab) 10.

FIG. 16A is a cross section of the FIG. 15 IC card 2 taken along line S1—S1. In the figure, a core member 12 of synthetic resin is sandwiched by paired surface members 14 and 16. Tab 10 with capacitors C1, C2 and IC chip 8 mounted thereto is fixed to surface member 14 exposed in a cavity 18 provided in core member 12. A joint of tab 10 and IC chip 8 is covered with a sealing agent 9 such as epoxy resin. Coil 4 is arranged between surface member 14 and core member 12. Coil 4 and tab 10 are connected together via a wire 20.

FIG. 16B is a circuit diagram of IC card 2. Referring to the figure, in IC card 2 an electromagnetic wave sent from a reader/writer (an interrogator (not shown)) is received at a resonator circuit 22 configured of coil 4 and capacitor C1 and it is used as a power supply. It should be noted that capacitor C2 is a power smoothing capacitor.

Furthermore, information superimposed on the electromagnetic wave and thus sent therewith is decrypted by a control unit (not shown) provided in IC chip 8. The control unit then rewrites a content of a non-volatile memory (not shown) provided in IC chip 8, makes a response to the reader/writer, and the like. The response is made by varying an impedance of resonator circuit 22. The reader/write obtains the content of the response by detecting an impedance variation (an impedance reflection) of its resonator circuit (not shown) that is associated with the impedance variation of IC card 2 resonator circuit 22.

As such, IC card 2 does not require an internal power supply and also allows non-contact communication of data.

However, conventional IC card 2 has the following disadvantage: in conventional IC card 2, a pad (or a terminal) (not shown) used for checking the performance of a mounted non-volatile memory or the like in the process for manufacturing the same is provided on a surface of IC chip 8. As such, the pad is exposed when surface members 14, 16 are removed. By applying a probe (an inspecting needle) on the exposed pad, the data in the non-volatile memory can readily be read and IC chip 8 can be operated. That is, the conventional IC card does not have high data security. Furthermore, as shown in FIG. 17, there is also an IC card which mounts to tab 10 two IC chips, i.e., an IC chip 6 with a control unit (not shown) and an IC chip 7 with a non-volatile memory (not shown). In such a type of IC card, in addition to the pad mentioned above a wire 24 connecting two IC chips 6 and 7 together is also exposed, which further facilitates reading the data stored in the non-volatile memory.

The present invention has been made to overcome the above disadvantages and contemplates an IC card and IC chip module with enhanced data security.

DISCLOSURE OF THE INVENTION

To achieve the above object, in one aspect of the present invention an IC card is comprised of an IC chip provided with an IC circuit, a housing body disposed to house the IC chip, and an exposure detection unit disposed to detect opened condition of the housing body, characterized in that when the exposure detection unit detects that the housing body has been opened the IC chip at least partially fails to normally operate.

As such, when the housing body housing the IC card is opened the IC circuit does not operate normally. Thus, if the IC card is improperly obtained and opened, it is extremely difficult to find the function of the IC card. Thus the IC card can obtain an enhanced data security.

Preferably the IC circuit includes a data storage unit disposed to store data wherein once the exposure detection unit detects the opened condition the data storage unit has the data at least partially rendered non-extractable.

As such, once the IC card has been opened the data storage unit has the data at least partially rendered non-extractable. Thus it is extremely difficult to obtain important data when the IC card is improperly opened.

Still preferably, the data storage unit has the data at least partially prohibited from being read once the exposure detection unit detects the opened condition.

As such, the data in the data storage unit cannot be read ones the housing body housing the IC card has been opened. The IC card may also be conveniently configured to allow the data to be read through a particular process if a party concerned does not want a third party to obtain the data but wants to keep the data.

Still preferably in the IC card the data storage unit has the data at least partially erased once the exposure detection unit detects the opened condition.

As such, once the housing body housing the IC card has been opened the data storage unit has the data at least partially erased. Thus, once the housing body has been opened no one can obtain the data. Thus the IC card can be provided with an extremely enhanced data security.

Still preferably, the IC card is comprised of a data processing unit disposed to process data wherein the data processing unit has a function at least partially stopped once the exposure detection unit detects the opened condition.

As such, the data processing unit has a function at least partially failing to function once the housing body housing the IC card has been opened. Thus, it is extremely difficult to know the function of the data processing unit if the IC card is improperly obtained and opened.

Preferably the exposure detection unit detects the opened condition by detecting external light entering when the housing body is opened.

As such, the opened condition can readily be detected, e.g., via a light receiving element arranged in the housing body.

Still preferably, as the exposure detection unit a plurality of light receiving elements are arranged in parallel.

For example, a plurality of small light-receiving elements may be arranged in the housing body to less noticeably arrange the elements. The plurality of light receiving elements can also be dispersedly arranged to detect the opened condition over a wide range of area.

Still preferably, the exposure detection unit detects the opened condition by detecting a variation in electrostatic capacitance that is introduced when the housing body is opened.

As such, the opened condition can be detected, e.g., if a capacitor defined by at least a portion of the housing body has an electrostatic capacitance varying when the housing body is opened.

Still preferably, the exposure detection unit detects the opened condition by detecting a variation in resistance that is introduced when the housing body is opened.

As such, the opened condition can be detected, e.g., if a resistor defined by at least a portion of the housing body has a value of resistance that varies when the housing body is opened.

Still preferably, the exposure detection unit detects the opened condition by detecting disconnection of a predetermined interconnection that is caused when the housing body is opened.

As such, the opened condition can be detected, e.g., if an interconnection arranged at at least a portion of the housing body is adapted to be disconnected when the housing body is opened.

In another aspect of the present invention, an IC chip module with at least two members integrally formed is comprised of an IC circuit provided at at least one of the members, characterized in that there is provided a exposure detection unit detecting opened condition of the IC chip module, wherein once the exposure detection unit detects the opened condition the IC circuit at least partially fails to normally function.

Preferably, the IC circuit includes a data storage unit disposed to store data, wherein once the exposure detection unit detects the opened condition the data storage unit has the data at least partially rendered non-extractable.

Still preferably, the data storage unit has the data at least partially prohibited from being read once the exposure detection detects the opened condition.

Still preferably, the data stored in the data storage unit is partially erased once the exposure detection unit detects the opened condition.

Still preferably, the IC circuit includes a data processing unit having a function at least partially stopped once the exposure detection unit detects the opened condition.

Still preferably, the exposure detection unit detects the opened condition by detecting external light entering when the IC chip module is opened.

Still preferably, the exposure detection unit is a plurality of light receiving elements arranged in parallel.

Still preferably, the exposure detection unit detects the opened condition by detecting a variation in electrostatic capacitance that is introduced when the IC chip module is opened.

Still preferably, the exposure detection unit detects the opened condition by detecting a variation in a value of resistance that is introduced when the IC chip module is opened.

Still preferably, the exposure detection unit detects the opened condition by detecting disconnection of a predetermined interconnection that is caused when the IC chip module is opened.

Still preferably, the exposure detection unit is at least partially defined by a portion of the IC chip circuit provided in the IC chip.

As such, the exposure detection unit is hardly recognized in the geometry of the IC chip, resulting in an enhanced data security. Furthermore, incorporating a portion or the entirety of the exposure detection unit into the IC chip in fabricating the IC chip can reduce the cost for manufacturing the IC card or the IC chip module.

Still preferably, the exposure detection unit detects the opened condition via a light receiving element detecting external light entering when the housing body is opened, wherein the light receiving element is defined by a portion of the IC circuit provided in the IC chip.

As such, a light receiving element such as a photodiode readily formed using the IC circuit, can be used to readily incorporate the exposure detection unit. It is also convenient if a plurality of small light receiving elements are dispersedly incorporated, since such light receiving elements are further hardly recognized in the geometry of the IC chip.

BRIEF DESCRIPTION OF THE DRAWINGS

FIG. 16A is a cross section taken along line S1—S1 of FIG. 15, and FIG. 16B is a circuit diagram of an IC card 2.

BEST MODES FOR CARRYING OUT THE INVENTION

The present invention will now be described in detail with reference to the drawings.

First Embodiment

Figure 1:
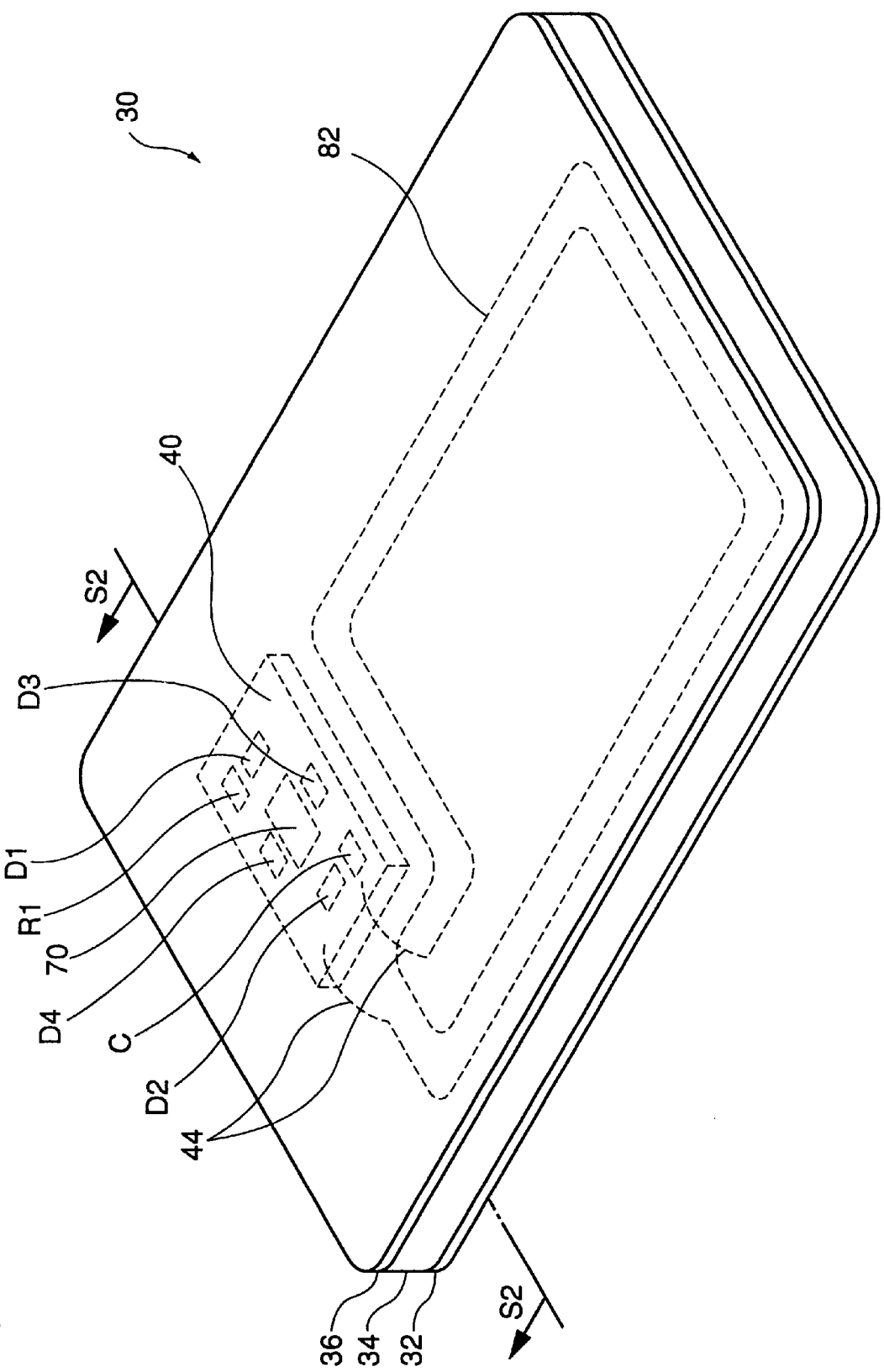
FIG. 1 is a perspective view of a geometry of an IC card 30 according to a first embodiment of the present invention.

FIG. 1 shows a configuration of an IC card 30 in a first embodiment of the present invention. In the figure, IC card 30 is a 1-coil IC card which can be used in conjunction with pre-paid cards, automatic ticket-gates of ski lifts, railroads and the like, automatic freight-sorting, and the like.

Figure 2:
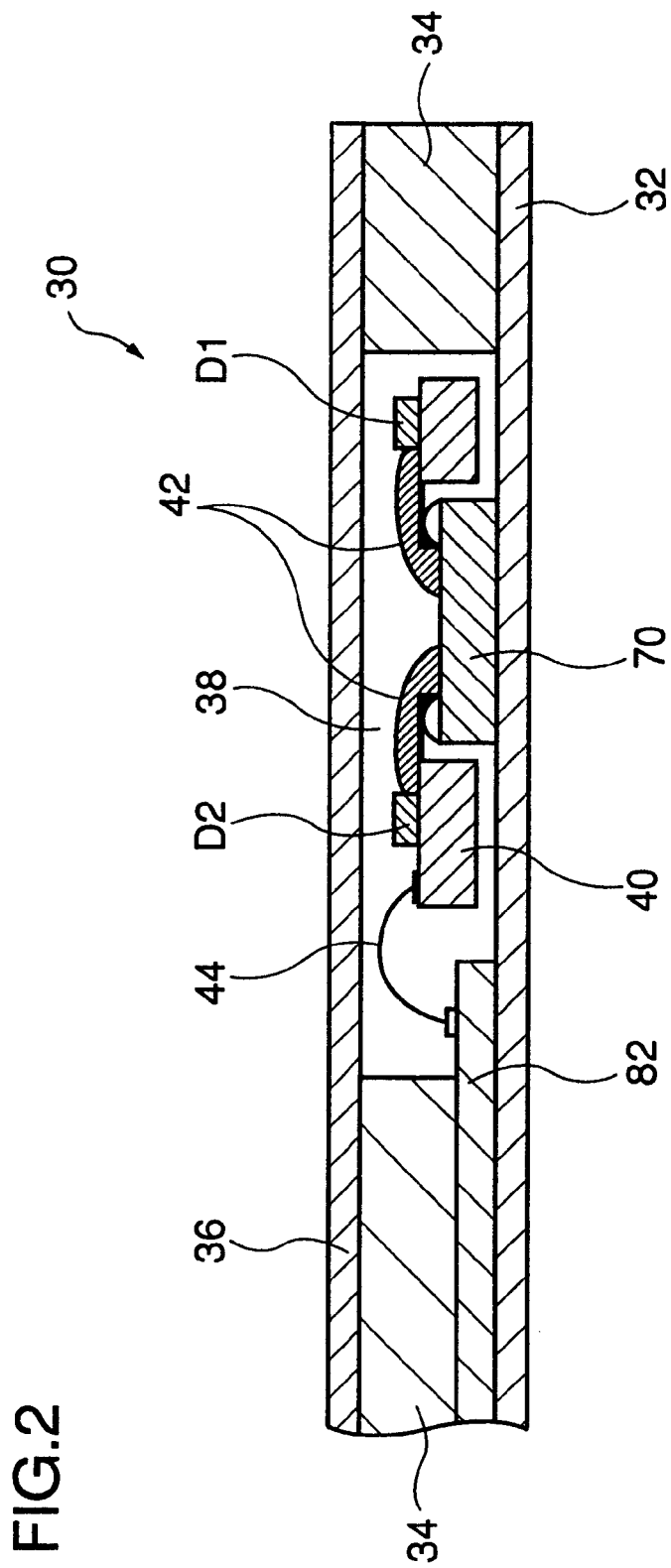
FIG. 2 shows a main cross section of the FIG. 11C card 30 taken along line S2—S2.

FIG. 2 is a main cross section of the FIG. 11C card 30 (taken along line S2—S2). IC card 30 has a surface member 32, a core member 34 and a surface member 36 that are stacked successively. Surface members 32, 36 are formed of synthetic resin, such as vinyl chloride, polyethylene terephthalate, (PET). Core member 34 is formed of synthetic resin. Surface members 32, 36 and core member 34 define a housing body.

A cavity 38 is provided in a layer formed by core member 34. In cavity 38 are arranged an IC chip 70, a tape automated bonding (tab) 40 with a mounted capacitor C configuring a resonator circuit 80 (shown in FIG. 3), and other components. Tab 40 is fixed to surface member 32. A joint of tab 40 and IC chip 70 is covered with a sealing agent 42 such as epoxy resin. An antenna 82 is arranged between surface member 32 and core member 34. Antenna 80 and tab 40 are connected together via a wire 44.

Furthermore, as shown in FIG. 1, photodiodes D1, D2, D3, D4 as light receiving elements and a resistor R1 are mounted to tab 40. Photodiodes D1–D4 and resistor R1 configure a exposure sensor 84 described later (shown in FIG. 3).

It should be noted that cavity 38 shown in FIG. 2 may be filled with synthetic resin or the like. As such, the synthetic resin is also contained in the housing body described above. Furthermore, one or both of surface members 32 and 36 may be dispensed with if cavity 38 is filled with synthetic resin or the like.

Figure 3:
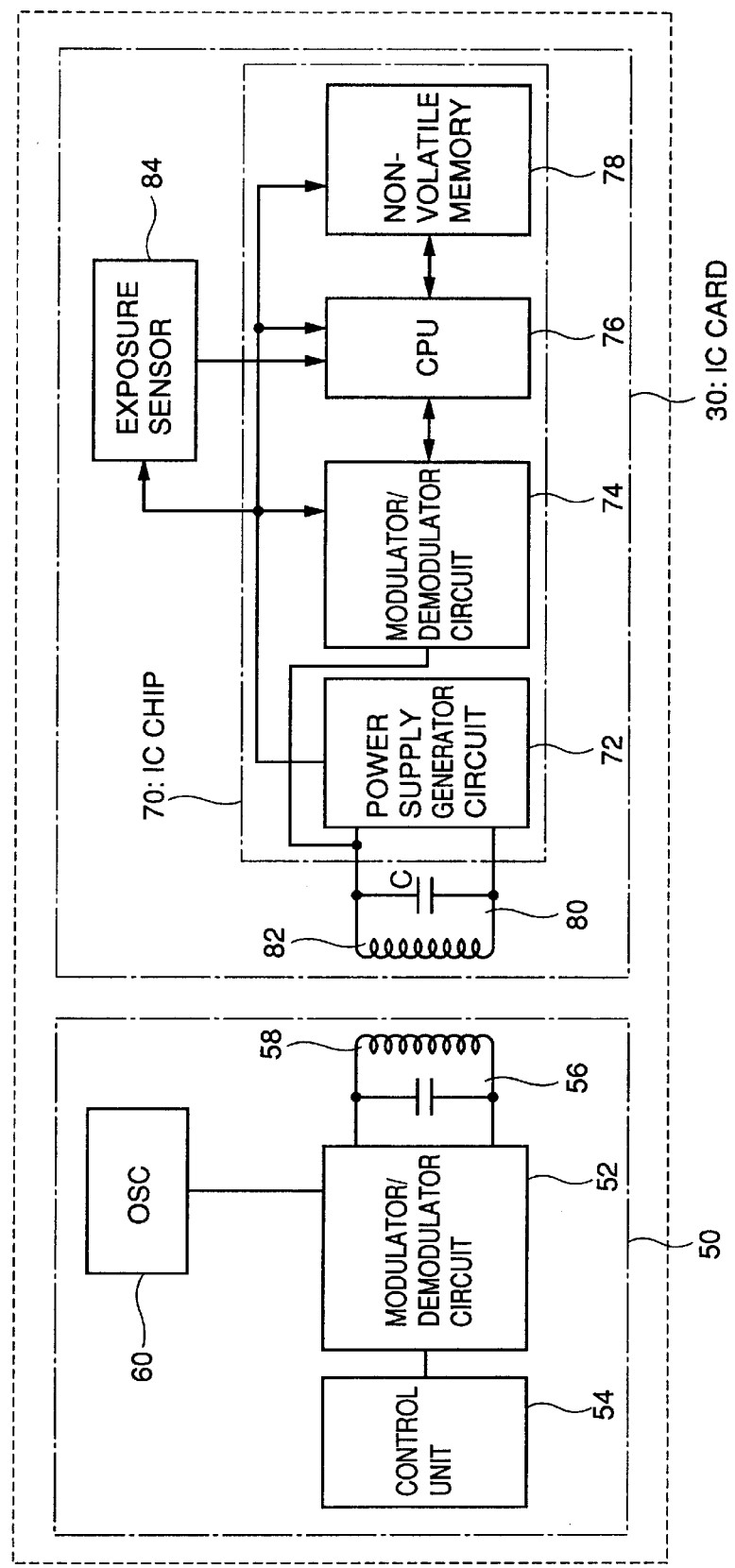
FIG. 3 shows a circuit configuration of IC card 30.

FIG. 3 is a block diagram showing a circuit configuration of IC card 30 and an interrogator 50. Interrogator 50 is controlled by a control unit 54 to send a radio frequency (RF) carrier wave from an oscillator circuit (OSC) 60 via an antenna 58. When IC card 30 approaches interrogator 50, the RF carrier wave is received by IC card 30 antenna 82. A power supply generator circuit 72 converts the received RF wave into a direct-current electrical power and supplies the power to other components. As such, IC card 30 becomes operable when it approaches interrogator 50.

To transmit information from interrogator 50 to IC card 30, control unit 54 controls a modulator/demodulator circuit 52 to modulate a RF carrier wave. In IC card 30, a modulator/demodulator circuit 74 demodulates the modulated RF carrier wave. A CPU 76 as a data processing unit obtains the demodulated information and thus rewrites a content of a non-volatile memory 78 serving as a data storage unit, returns information, and provide other necessary operations.

On the other hand, IC card 30 also transmits information to interrogator 50. It should be noted that IC card 30 does not have an oscillator circuit. Accordingly, interrogator 50 is adapted to send a RF carrier wave which is not modulated and IC card 30 is adapted to have modulator/demodulator circuit 74 varying an impedance of a resonator circuit 80. In interrogator 50, modulator/demodulator circuit 52 detects the impedance variation as that of resonator circuit 56 and demodulates it. Control unit 54 obtains the demodulated information and accordingly provides necessary operations.

When IC card 30 is moved away from interrogator 50, IC card 30 loses its power supply and thus stops operating. However, IC card 30 has non-volatile memory 78 and can thus maintain the information stored therein if IC card 30 loses its power supply.

A exposure sensor 84, configuring an exposure detection unit, outputs an exposure detection signal to CPU 76 when exposure sensor 84 detects that surface member 32, 36 (shown in FIG. 2) has been removed. In response to the exposure detection signal, CPU 76 performs a predetermined operation, such as erasure of data stored in non-volatile memory 78.

Figure 4:
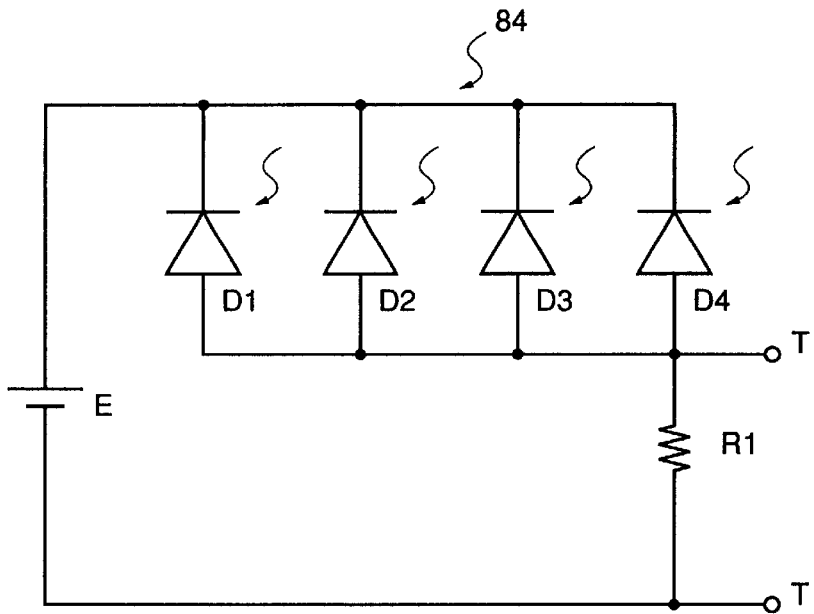
FIG. 4 is a circuit diagram showing a specific example of a exposure sensor 84.

FIG. 4 is a circuit diagram showing a specific example of exposure sensor 84. Exposure sensor 84 is configured by four photodiodes D1–D4 connected in parallel and a resistor R1 connected in series to photodiodes D1–D4. Exposure sensor 84 receives a power supply voltage E from a power supply generator circuit 72 (shown in FIG. 3). Exposure sensor 84 has two output terminals Ts connected to CPU 76 (shown in FIG. 3).

The voltage across to output terminals Ts is set to have a value no more than a predetermined threshold when any of photodiodes D1–D4 does not receive light. It is also set to have a value no less than the threshold when any of photodiodes D1–D4 receives light.

Normally, as shown in FIG. 2, photodiodes D1–D4 are arranged in cavity 38 sealed by surface members 32, 36 and core member 34. Thus the voltage across two output terminals Ts has a value no more than the threshold. When IC card 30 is opened, e.g. by removing surface member 36, light enters cavity 38 and is thus received by any of photodiodes D1–D4. Thus the voltage across two output terminals Ts rises to a value no less than the threshold. The voltage created across two output terminals Ts that has a value no less than the threshold corresponds to the exposure detection signal described above.

The present example is adapted to provide a voltage across two output terminals Ts that has a value no less than a threshold when any of photodiodes D1–D4 receives light. However, it may be adapted to provide a voltage across two output terminals Ts that has a value no less than the threshold when at least two, at least three or all of photodiodes D1–D4 receive light, so that photodiodes D1–D4 may individually have a small capacity and can thus be hardly recognized.

While in the present example four photodiodes D1–D4 are arranged in parallel, any number of photodiodes may be connected in parallel. Only a single photodiode may also be used.

Furthermore, while in the present example a photodiode is used as a light detecting means, a phototransistor may be alternatively used as the light detecting means. It should be noted that the technique of detecting external light to detect the exposure is not limited to the circuit described above.

Figure 5A:
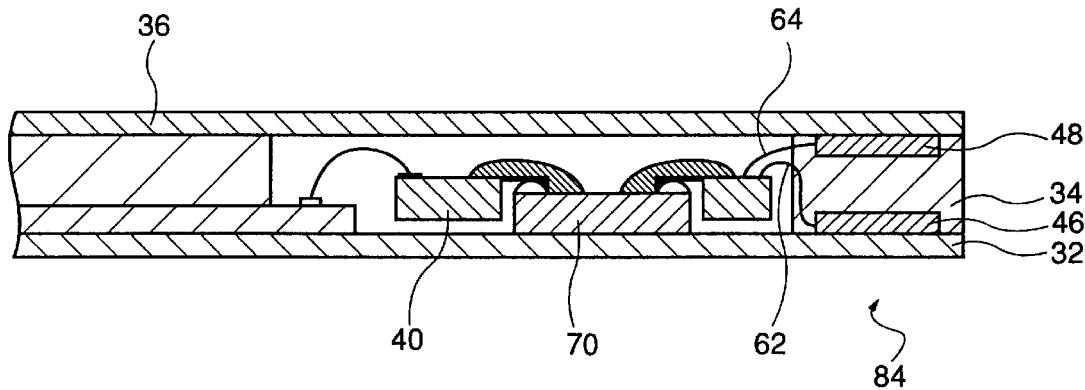
FIG. 5A is a main cross section of IC card 30 with exposure sensor 84 in a first modification of the present invention.
Figure 5B:
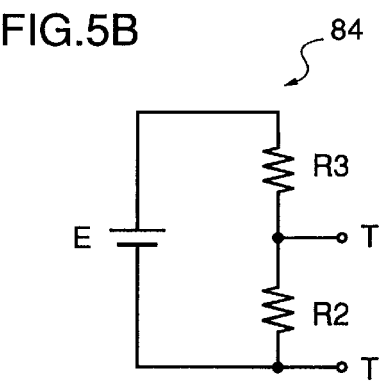
FIG. 5B is a circuit diagram of exposure sensor 84 therein.

FIGS. 5A and 5B illustrate a first modification of exposure sensor 84. FIG. 5A shows a main cross section of IC card 30 with exposure sensor 84 in the first modification. FIG. 5B is a circuit diagram of exposure sensor 84.

As shown in FIG. 5B, exposure sensor 84 is configured of two resistors R2 and R3 connected in series. As is similar to the example shown in FIG. 4, exposure sensor 84 receives power supply voltage E from power supply generator circuit 72 and has two output terminals Ts connected to CPU 76.

As shown in FIG. 5A, an electrode 46 is fixed on an internal side of surface member 32 and an electrode 48 is fixed on an internal side of surface member 36. Core member 34 between electrodes 46 and 48 is adapted to have a predetermined electrical resistance R2. More specifically, core member 34 corresponds to resistor R2 shown in FIG. 5B. Electrodes 46 and 48 are connected to tab 40 via wires 62 and 64, respectively. Resistor R3 is arranged at tab 40, as appropriate (not shown).

The voltage across two output terminals Ts is set to have a value no more than a predetermined threshold when the resistance between electrodes 46 and 48 is equal to R2. It is also set to have a value no less than the threshold when the resistance between electrodes 46 and 48 exceeds R2.

Normally, electrodes 46 and 48 adhere to core member 34, as shown in FIG. 5A. Thus the voltage across two output terminals Ts is no more than the threshold. However, if IC card 30 is opened, e.g., by removing surface member 36, electrode 48 adhering to surface member 36 is removed from core member 34 and the resistance between electrodes 46 and 48 is thus extremely increased. Thus the voltage across two output terminals Ts exceeds the threshold. As is shown in the FIG. 4 example, the voltage developed across two output terminals Ts that exceeds the threshold corresponds to the exposure detection signal described above. It should be noted that the technique of detecting a resistance variation to detect the exposure is not limited to the circuit described above.

Figure 6A:
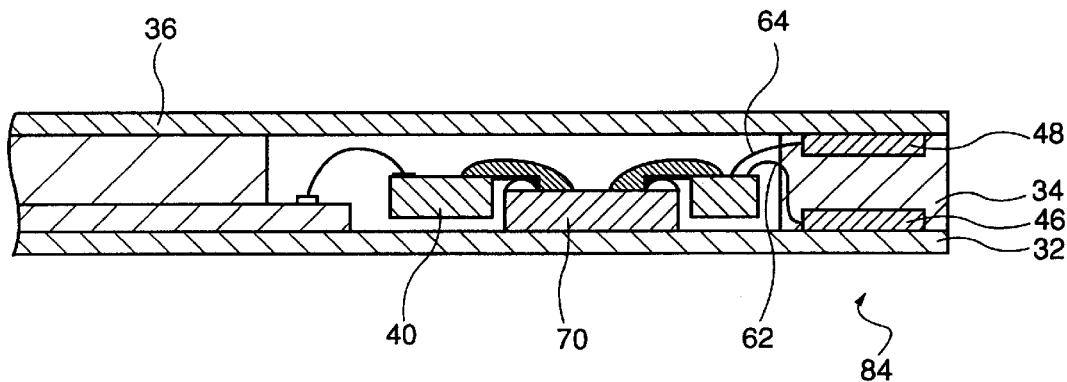
FIG. 6A is a main cross section of IC card 30 with exposure sensor 84 in a second modification of the present invention.
Figure 6B:
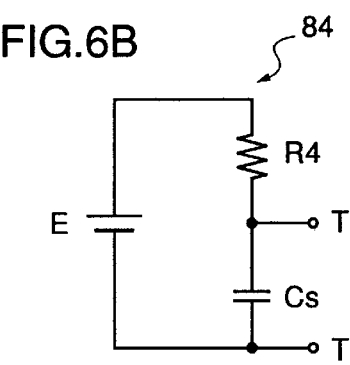
FIG. 6B is a circuit diagram of exposure sensor 84 therein.

FIGS. 6A and 6B show a second modification of exposure sensor 84. FIG. 6A is a main cross section of IC card 30 with exposure sensor 84 in the second modification. FIG. 6B is a circuit diagram of exposure sensor 84 therein.

As shown in FIG. 6B, exposure sensor 84 is configured of a capacitor Cs and a resistor R4 connected in series thereto. As is similar to each example above, exposure sensor 84 receives power supply voltage E from power supply generator circuit 72 and has two output terminals Ts connected to CPU 76.

As shown in FIG. 6A, electrode 48 adheres to an internal side of surface member 32 and electrode 48 to that of surface member 36. The FIG. 6A example is similar to the FIG. 5 example in that electrodes 46 and 48 are connected to tab 40 via wires 62 and 64, respectively. It should be noted, however, that in exposure sensor 84 shown in FIG. 6, core member 34 between electrodes 46 and 48 is adapted to have a predetermined dielectric constant. More specifically, electrodes 46 and 48 and core member 34 configure capacitor Cs with a predetermined electrostatic capacitance Cs. Resistor R4 is arranged at tab 40, as appropriate (not shown).

After power supply E ON, a voltage across two output terminals Ts attains a power supply voltage according to a time constant determined by capacitor Cs and resistor R4. As such, with resistor R4 set to have an appropriate value, the voltage across two output terminals Ts is set to have a value no more than a predetermined threshold for electrostatic capacitance Cs between electrodes 46 and 48 when a predetermined period of time has elapsed since power-on. It is also set to have a value no less than the threshold for an electrostatic capacitance between electrodes 46 and 48 that is smaller than Cs, e.g., for a reduced time constant when the predetermined period of time has elapsed since power-on.

Normally, electrodes 46 and 48 adhere to core member 34, as shown in FIG. 6. Thus, the voltage across two output terminals Ts has a value no more than the threshold when the predetermined period of time has elapsed since power-on. However, when IC card 30 is opened, e.g., by removing surface member 36, electrode 48 adhering to surface member 36 is removed from core member 34 and also moved farther away from electrode 46 adhering to surface member 32. This results in an electrostatic capacitance smaller than Cs between electrodes 46 and 48 and hence a reduced time constant. As a result, the voltage across two output terminals Ts will have a value no less than the threshold when the predetermined period of time has elapsed since power-on. In this example, the voltage across two output terminals Ts that exceeds the threshold when the predetermined period of time has elapsed since power-on, corresponds to the exposure detection signal described above.

It should be noted that the technique of detecting a variation in electrostatic capacitance to detect the exposure is not limited to the circuit described above. For example, the exposure may be detected by detecting that variation in the resonance frequency of a resonator circuit, configured of a capacitor and a coil, which is attributed to a variation in the electrostatic capacitance of the capacitor.

Figure 12:
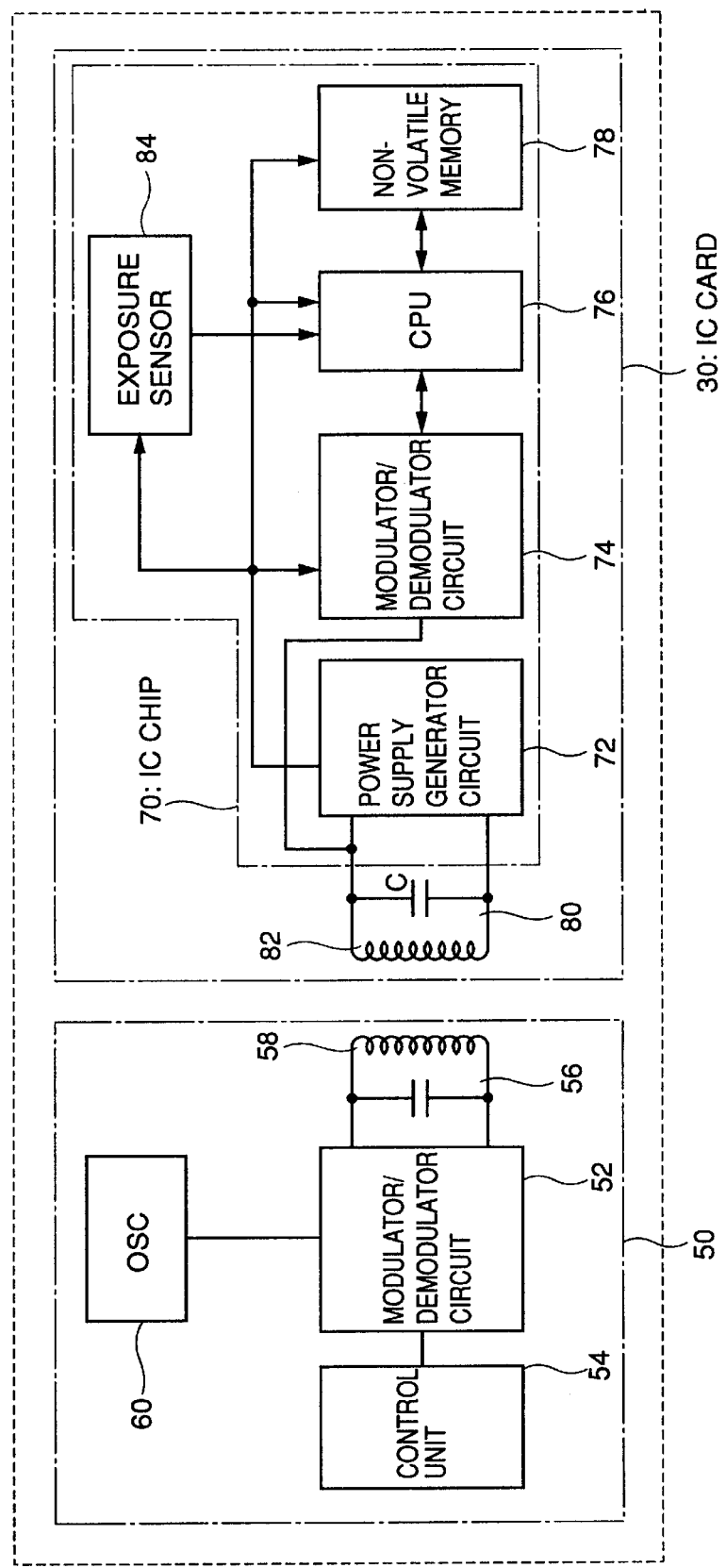
FIG. 12 shows a configuration of an IC card with exposure sensor 84 provided internal to an IC chip.

It should be noted that although in each of the above embodiments, exposure sensor 84 is positioned external to IC chip 70, as shown in FIG. 3, exposure sensor 84 may be positioned at any other locations. For example, as shown in FIG. 12, exposure sensor 84 may be positioned internal to IC chip 70. Furthermore, one portion of exposure sensor 84 may be positioned internal to IC chip 70 and the other portion of exposure sensor 84 external to IC chip 70.

Exposure sensor 84 partially or entirely located internal to IC chip 70 can be less recognizable in the geometry of IC chip 70 to provide a further enhanced data security. Incorporating a portion or the entirety of exposure sensor 84 into IC chip 70 in fabricating IC chip 70, can also reduce the cost for manufacturing IC card 30. It should also be noted that in the IC chip module described later, exposure sensor 84 may partially or entirely be provided internal to an IC chip, as in IC card 30.

Figure 13A:
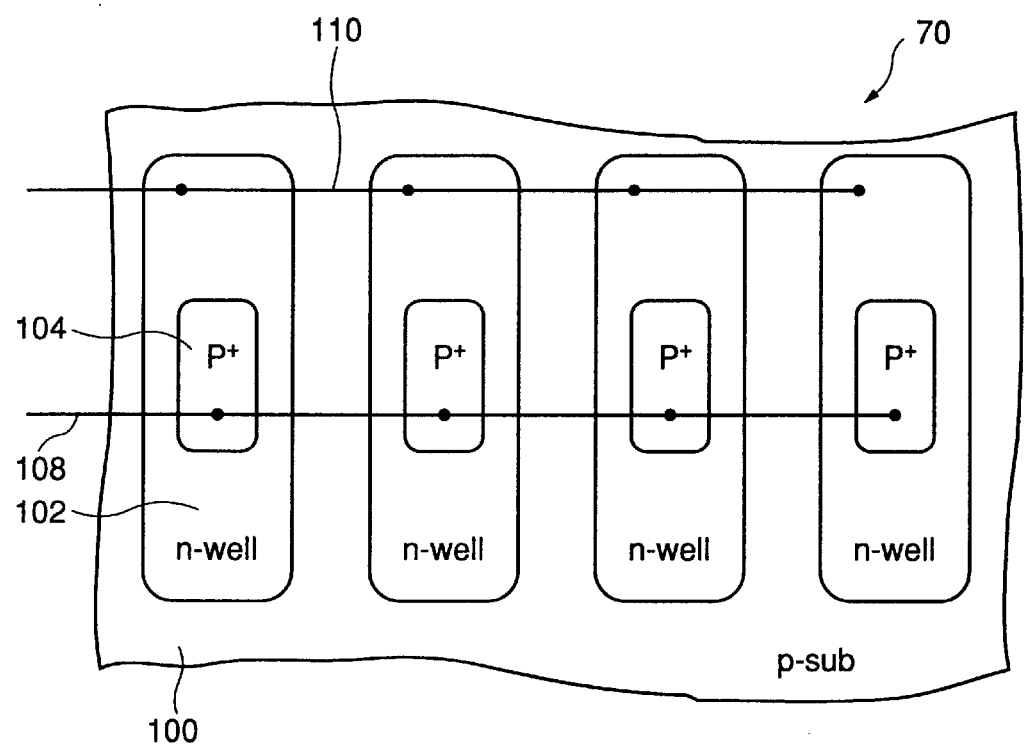
FIGS. 13A and 13B are an exemplary planar configuration and a main cross section, respectively, of an IC chip 70 when an IC circuit is partially used to configure a photodiode.
Figure 13B:
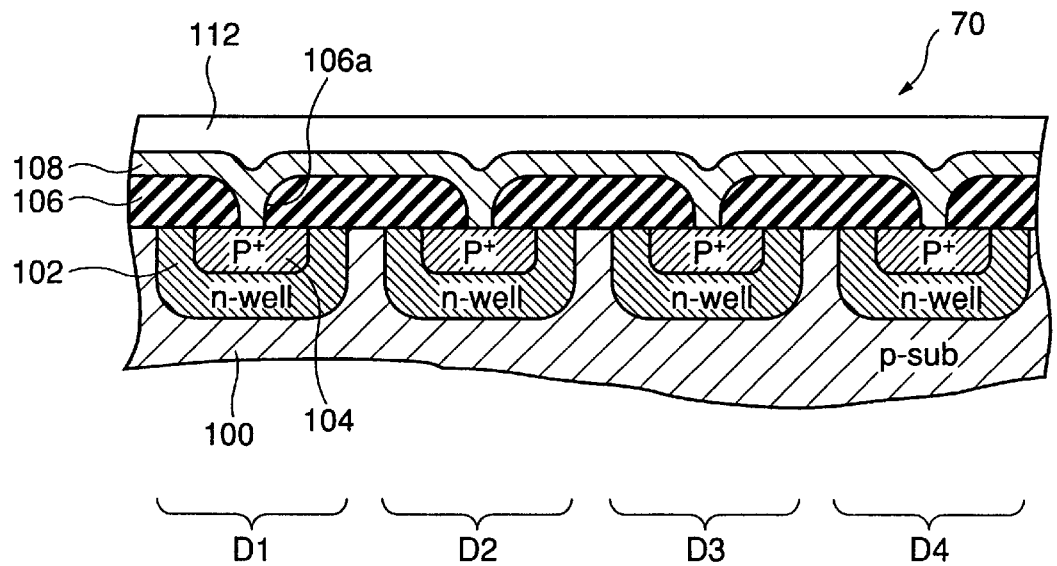

FIGS. 13A and 13B partially show a configuration of IC chip 70 when photodiodes D1–D4 configuring the above-described exposure sensor 84 (shown in FIG. 4) are formed of a portion of an IC circuit provided in IC chip 70. FIG. 13A schematically shows a planar configuration of IC chip 70. FIG. 13B is a main cross section of IC chip 70.

As shown in FIG. 13B, IC chip 70 has a p-type semiconductor substrate 100 with multiple (in this example, 4) n well regions 102 formed therein. Each n well region 102 has a p$^+$ region 104. Each n well 102 and each p$^+$ region 104 configure a respective one of photodiodes D1–D4.

P$^+$ regions 104 are mutually connected via an aluminum interconnection 108 through a contact hole 106a provided in an interlayer film 106. Similarly, n well regions 102 are mutually connected via an aluminum interconnection 110 (shown in FIG. 13A). As such, aluminum interconnections 108 and 110 connect four diodes D1–D4 in parallel. They are covered by a passivation film 112.

As has been described previously (referring to FIG. 2), when IC card 30 is opened, e.g., by removing surface member 36, light transmitted through passivation film 112 and interlayer film 106 is received by photodiodes D1–D4 formed close to a surface of IC chip 70. Thus a exposure detection signal is produced.

As described above, it is technically, relatively easy to form photodiodes D1–D4 of a portion of an IC circuit provided in IC chip 70. Furthermore, it is convenient if such multiple small photodiodes are incorporated dispersedly, since the photodiodes are further hardly recognized in the geometry of IC chip 70.

Figure 14A:
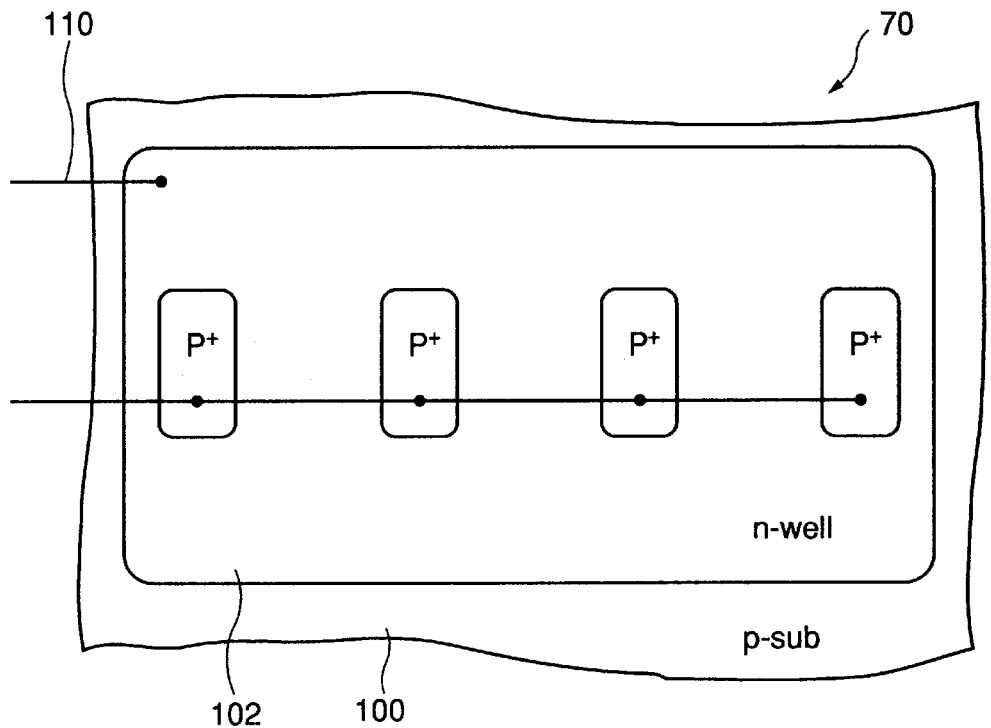
FIGS. 14A and 14B are a variation of a planar configuration and a main cross section thereof, respectively, of IC chip 70 when an IC circuit is partially used to configure a photodiode.
Figure 14B:
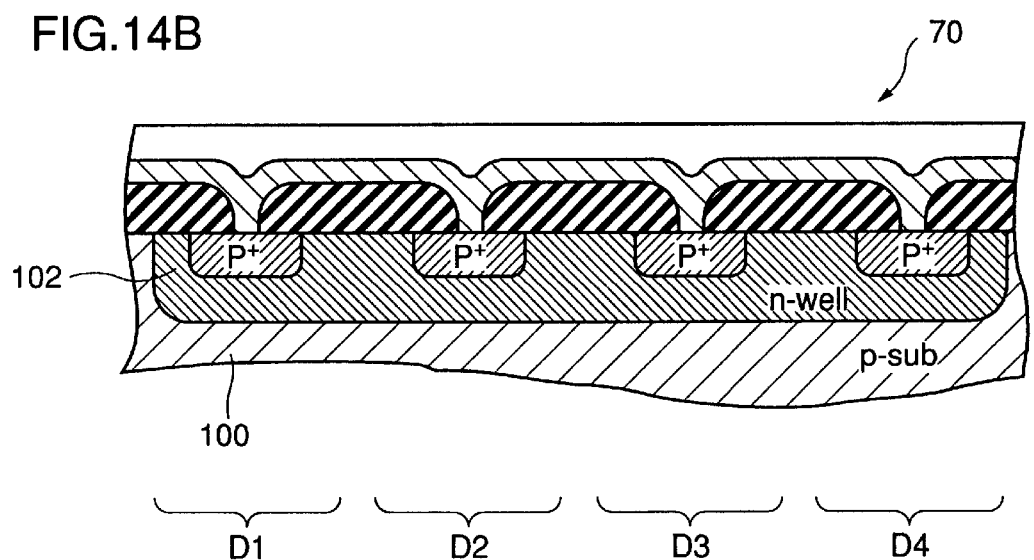
Figure 15:
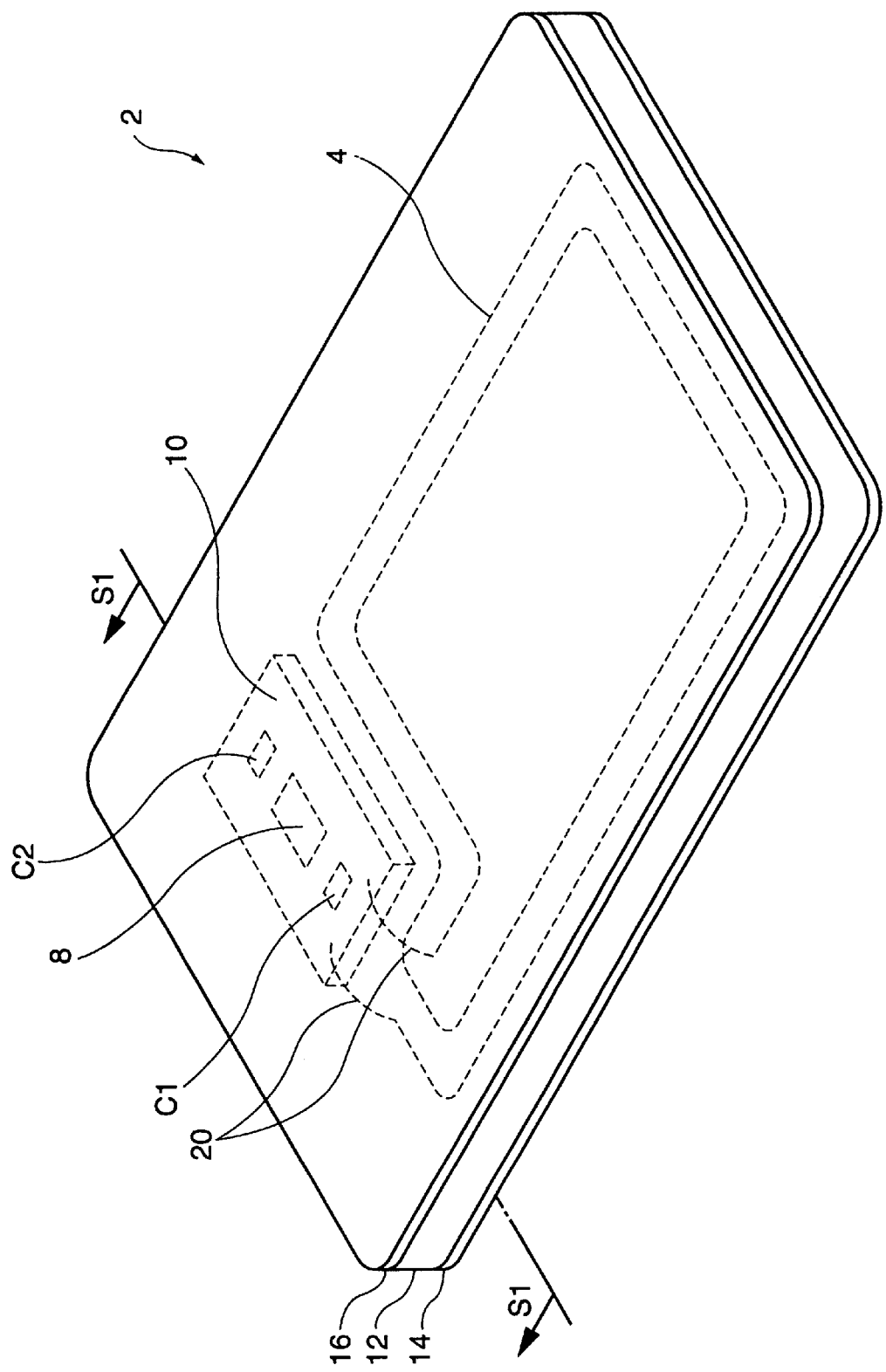
FIG. 15 shows one example of a conventional, non-contact IC card.
Figure 17:
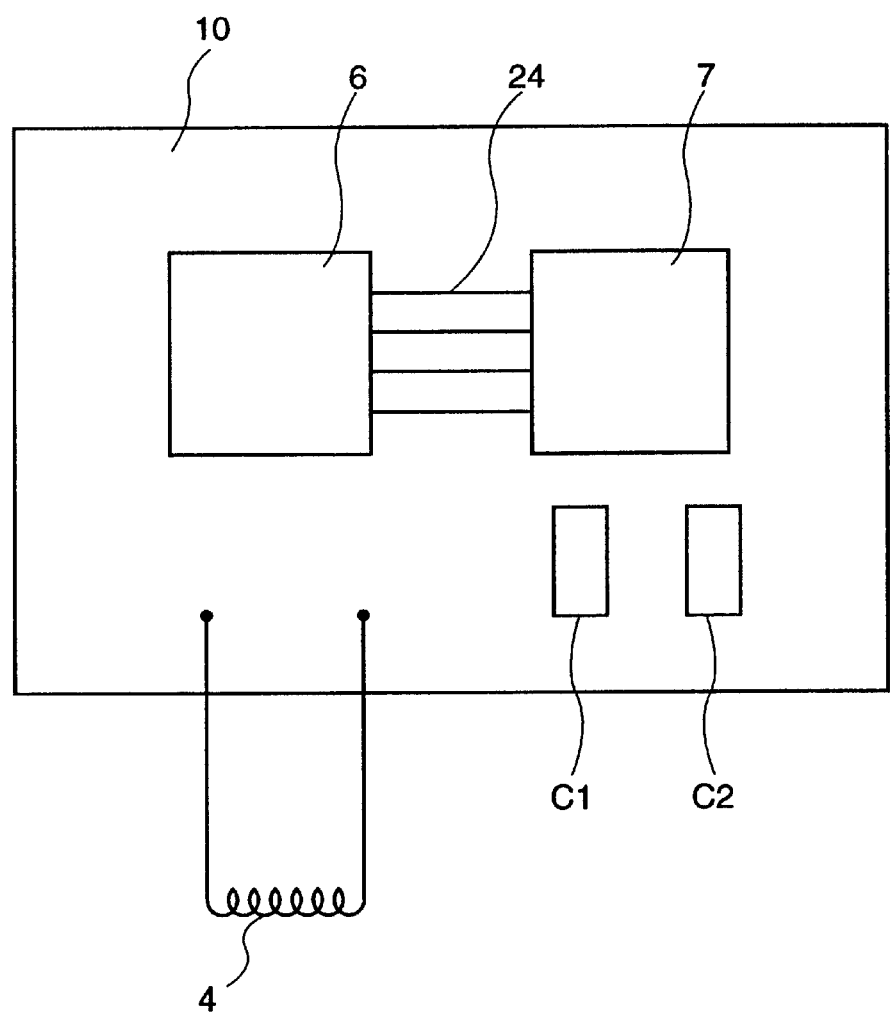
FIG. 17 shows another exemplary, conventional, non-contact IC card.

It should be noted that while the FIGS. 13A and 13B example shows that in p-type semiconductor substrate 100 a plurality of n well regions 102 are formed corresponding to photodiodes D1–D4, in p-type semiconductor substrate 100 a single, common n well region 102 can be provided for photodiodes D1–D4, as shown in FIGS. 14A and 14B, to conveniently reduce the length of aluminum interconnection 110.

An exemplary processing executed by CPU 76 when IC card 30 is opened will now be described with reference to FIG. 3 or 12 and the FIG. 7 flow chart. As has been described above, IC card 30 does not have an internal power supply. As such, if IC card 30 is opened with CPU 76 not in operation, CPU 76 does not know that IC card 30 has been opened.

When a person who has opened IC card 30 desires to know CPU 76 operation, obtain non-volatile memory 78 data or the like and finds a pad for power supply (not shown) of exposed IC chip 70 and applies a probe or the like on the pad to supply power to IC chip 70, then CPU 76 is initiated (step S1).

After it is initiated, CPU 76 first checks whether exposure sensor 84 has output the exposure detection signal (step S2). If the exposure detection signal has not been received, CPU 76 operates normally.

If IC card 30 is open, exposure sensor 84 has already output the exposure detection signal, as has been described above. Accordingly, CPU 76 erases all data stored in non-volatile memory 78 (step S3).

Once IC card 30 has been opened, the data in non-volatile memory 78 are all erased and no one can thus obtain the data. This can provide an extremely enhanced data security.

It should be noted that while in the present example the data in non-volatile memory 78 are all erased once IC card 30 has been opened, the data in non-volatile memory 78 may only partially be erased once IC card 30 has been opened, to conveniently, selectively erase only the data that must not be obtained by third parties while maintaining the other data.

Figure 7:
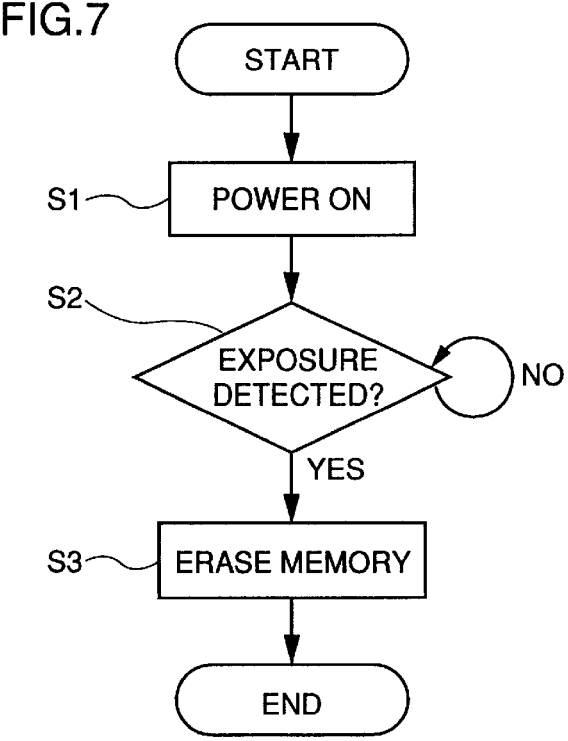
FIG. 7 is a flow chart representing an exemplary process executed by a CPU 76 when IC card 30 is opened.
Figure 8:
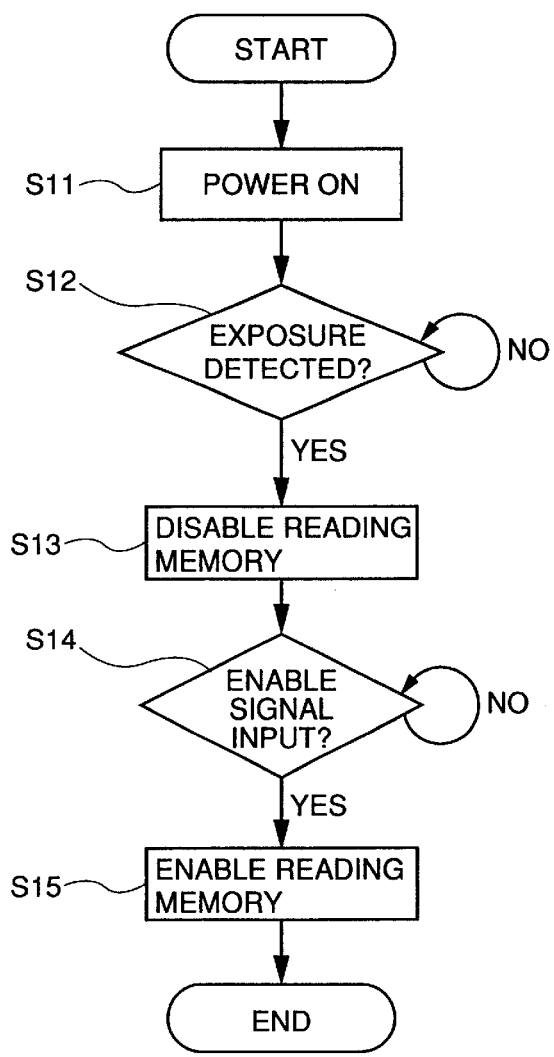
FIG. 8 is a flow chart representing a first modification of the process executed by CPU 76 when IC card 30 is opened.

FIG. 8 is a flow chart representing another specific, exemplary processing executed by CPU 76 when IC card 30 is opened. The process until CPU 76 detects that IC card 30 has been opened (steps S11, S12) is similar to that represented in the FIG. 7 example (steps S1, S2). In the present example, however, CPU 76 disables reading any of the data stored in non-volatile memory 78 once CPU 76 detects that IC card 30 has been opened (step S13).

The present example is also distinguished from the FIG. 7 example in that non-volatile memory 78 data that have been rendered unreadable can also be re-read by applying a particular processing.

More specifically, CPU 76 monitors whether a predetermined pad (not shown) provided on IC chip 70 has received a predetermined enable signal (a read enable signal) (step S14). When the enable signal has been received, CPU 76 again enables reading non-volatile memory 78 data (step S15). Coding the enable signal can more or less prevent third parties from reading the data.

It is convenient if opening IC card 30 disables reading any of the data in non-volatile memory 78 and applying a particular processing allows the data to be obtained, since the possibility that third parties obtain the data can be reduced and the data can also be extracted later as required.

It should be noted that while in the present example, opening IC card 30 disables reading any of the data in non-volatile memory 78, opening IC card 30 may alternatively only disable reading a portion of the data in non-volatile memory 78.

In the above, inputting the enable signal again enables reading any of the non-volatile memory 78 data having been rendered unreadable. In contrast, inputting the enable signal may again only enable reading a portion of non-volatile memory 78 data having been rendered unreadable. This is a preferable configuration in terms of data security because no one can read the data which absolutely should not be obtained by third parties.

Figure 9:
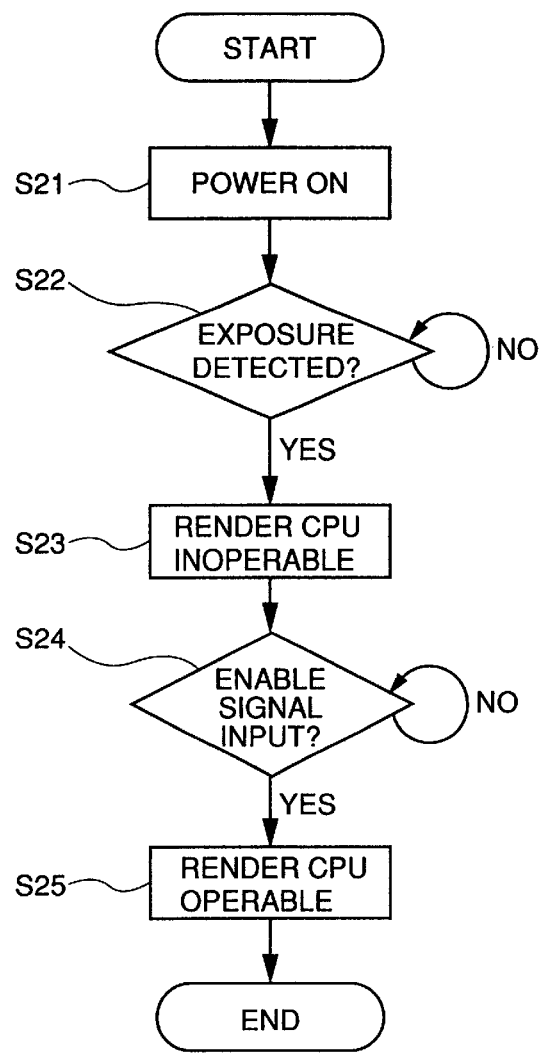
FIG. 9 is a flow chart representing a second modification of the process executed by CPU 76 when IC card 30 is opened.

FIG. 9 represents still another specific exemplary process provided by CPU 76 when IC card 30 is opened. The process until CPU 76 detects that IC card 30 has been opened (steps S21, S22) is similar to that in each specific example above. In the present example, however, CPU 76 renders itself inoperable once CPU 76 detects that IC card 30 has been opened (step S23).

Once IC card 30 has been opened, CPU 76 does not function. Thus, it is extremely difficult to find its data processing function if the IC card or IC chip module is improperly obtained and opened.

As in the FIG. 8 example, in the present example also CPU 76 once rendered non-operable can again be operated by applying a particular processing. More specifically, CPU 76 can again be operated only when a predetermined pad (not shown) provided on IC chip 70 receives a predetermined enable signal (a CPU operation enable signal) (steps S24, S25).

In the present example, opening IC card 30 disables the entire function of CPU 76. In contrast, opening IC card 30 may stop only a portion of the CPU 76 function while not stopping the remainder of the CPU 76 function. This is a convenient configuration since it can stop only the processing function(s) which should not be known to third parties while not stopping the other, general function(s).

In the present example, inputting an enable signal enables all of the functions of CPU 76 that have been stopped. In contrast, inputting the enable signal may again enable only a portion of the stopped CPU 76 functions. This is a preferable configuration in terms of data security because no one can obtain the processing function(s) which absolutely should not be known to third parties.

While the present example a stopped CPU 76 function is again enabled in response to a predetermined enable signal, it may be adapted to never operate again once it has been stopped.

Second Embodiment

Figure 10A:
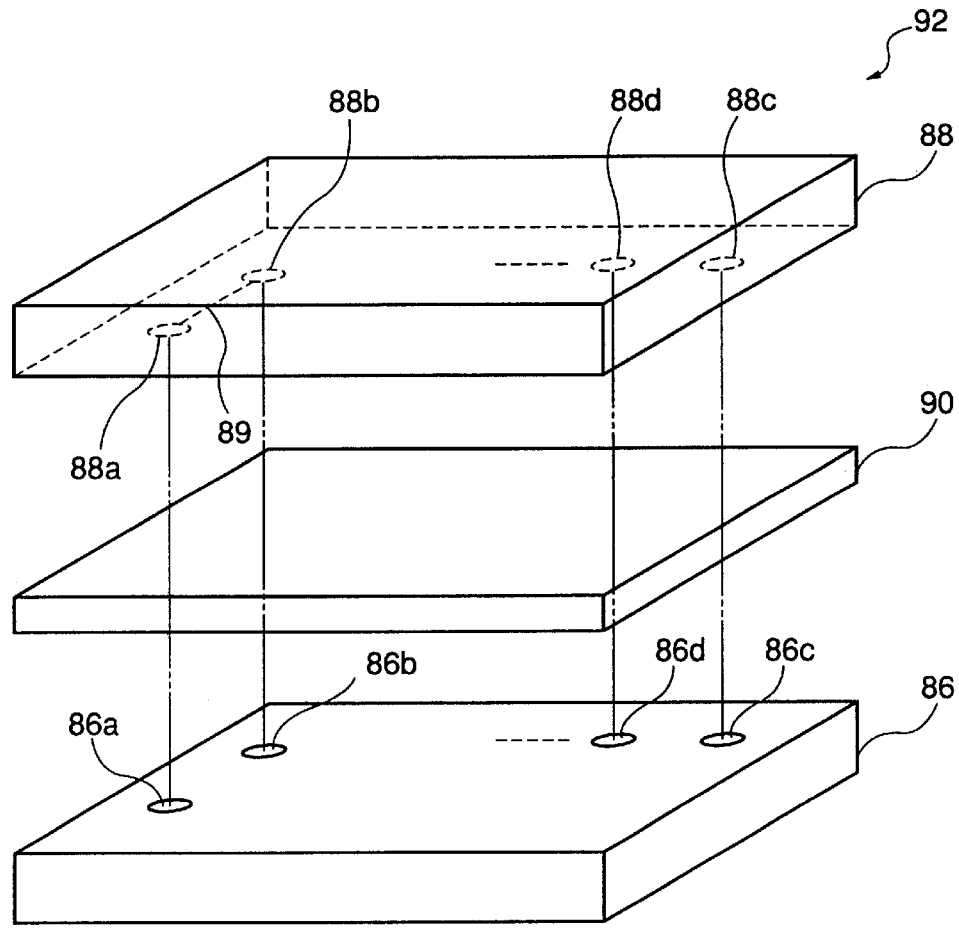
FIG. 10A is an exploded perspective view of an IC chip module 92 in a second embodiment of the present invention.

FIG. 10A is an exploded perspective view of an IC chip module 92 in a second embodiment of the present invention. IC chip module 92 is incorporated in an IC card used for pre-paid cards, automatic ticket-gates for ski lifts, railroads and the like, automatic freight-sorting, and the like.

IC chip module 92 is formed by bonding IC chips 86 and 88 to an anisotropic conductor 90. In the present embodiment, a CPU, a modulator/demodulator circuit, a power supply generator circuit and other main circuits (not shown) are mounted to IC chip 86, and a non-volatile memory (not shown) is mounted to IC chip 88. IC chip 86 has an upper surface provided with a plurality of terminals 86a, 86b, . . . , and IC chip 88 has a lower surface provided with terminals 88a, 88b, . . . positionally opposite to terminals 86a, 86b . . . .

Anisotropic conductor 90 is an adhesive conductor which is conductive only in one direction. It may be, for example, anisolum (available from Hitachi Chemical Co., Ltd.), a thermosetting adhesive. Such anisotropic conductor 90 allows IC chips 86 and 88 to firmly adhere thereto to thereby electrically connect together terminals 86a, 86b, . . . and terminals 88a, 88b, . . . positionally opposite to terminals 86a, 86b, to form IC chip module 92.

Terminals 86c, 86d, . . . and terminals 88c, 88d, . . . that are electrically connected together allow electrical connection between the main circuits provided in IC chip 86 and the non-volatile memory provided in IC chip 88. IC chip module 92 thus fabricated and a resonator circuit (not shown) including an antenna are sealed into a housing body (not shown) to complete a non-contact IC card.

Figure 10B:
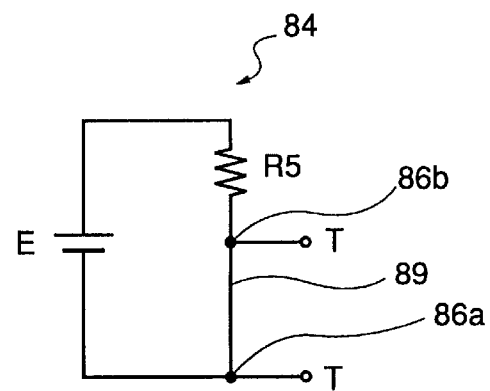
FIG. 10B is a circuit diagram of exposure sensor 84 therein.

IC chip module 92 includes exposure sensor 84. FIG. 10B is a circuit diagram of exposure sensor 84 in the present embodiment. As shown in FIG. 10B, exposure sensor 84 is configured by connecting an interconnection 89 and a resistor R5 in series. Similar to each exposure sensor 84 described above (shown in FIG. 5B, for example), exposure sensor 84 receives power supply voltage E from a power supply generator circuit (not shown) provided in IC chip 86 and has two output terminals Ts connected to a CPU (not shown) provided in IC chip 86.

As shown in FIG. 10A, terminals 88a and 88b provided to IC chip 88 are electrically connected together internal to IC chip 88 via interconnection 89. As such, terminals 86a and 86b provided to IC chip 86 are electrically connected together via anisotropic conductor 90, terminal 88a, interconnection 89 and terminal 88b. Resistor R5 shown in FIG. 10B is arranged in IC chip 86, as appropriate (not shown).

The voltage across two output terminals Ts is set to have a value no more than a predetermined threshold when interconnection 89 allows conduction between two output terminals Ts. It is also set to have a value no less than the threshold when conduction (connection) fails between two output terminals Ts.

Normally, IC chips 8G and 88 are connected together via anisotropic conductor 90 and conduction is thus achieved between two output terminals Ts. Thus the voltage across two output terminals Ts is no more than the threshold. However, when IC chip module 92 is opened or IC chips 86 and 88 are separated from each other, conduction fails between terminals 86a and 86b and the voltage across two output terminals Ts has a value no less than the threshold. The voltage created across two output terminals Ts that has a value no less than the threshold corresponds to the exposure detection signal described above.

It should be noted that the technique of detecting disconnection of the interconnection to detect the exposure is not limited to the circuit described above.

Furthermore, as an alternative to anisotropic conductor 90, other techniques, such as soldering, a bumping technique using eutectic bonding, may be used to electrically connect terminals 86a, 86b, . . . and terminals 88a, 88b, . . . together.

Third Embodiment

Figure 11A:
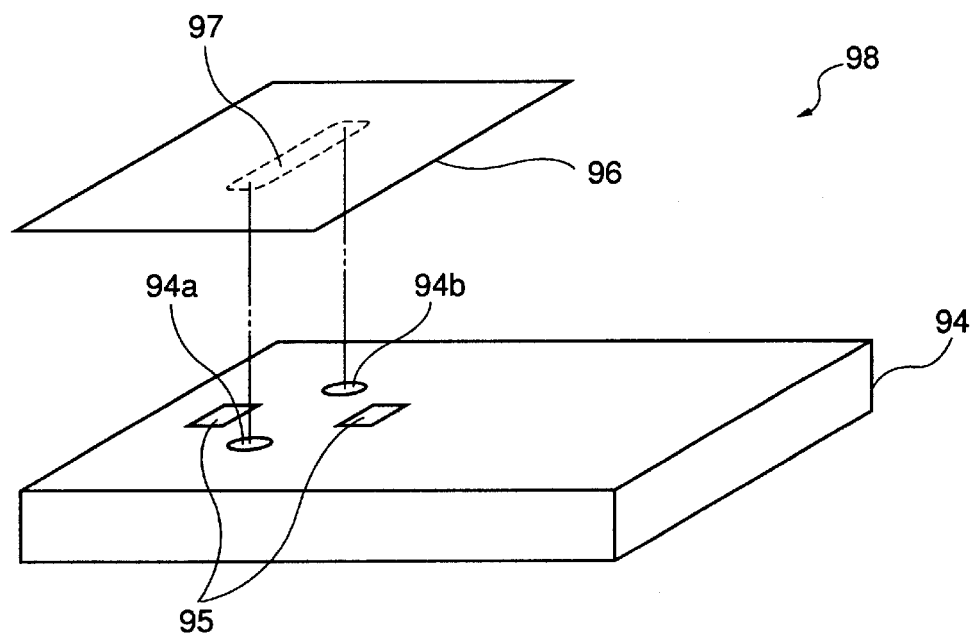
FIG. 11A is an exploded perspective view of an IC chip module 98 in a third embodiment of the present invention.

FIG. 11A is an exploded perspective view of an IC chip module 98 in a third embodiment of the present invention. IC chip module 98 includes an IC chip 94 and a seal member 96 stuck on an upper surface of IC chip 94. The present embodiment differs from IC chip module 92 (shown in FIG. 10A) described above in that a CPU, a modulator/demodulator circuit, a power supply generator circuit and other main circuits, and a non-volatile memory are mounted to a single IC chip 94.

IC chip 94 has an upper surface provided with two terminals 94a and 94b and a pad 95 used to check a non-volatile memory. Seal member 96 is stuck to cover terminals 94a and 94b and pad 95. Seal member 96 on its adhesive side at at least that portion in a strip facing terminals 94a and 94b, provides a strip of interconnection 97 formed of a conductive material.

Figure 11B:
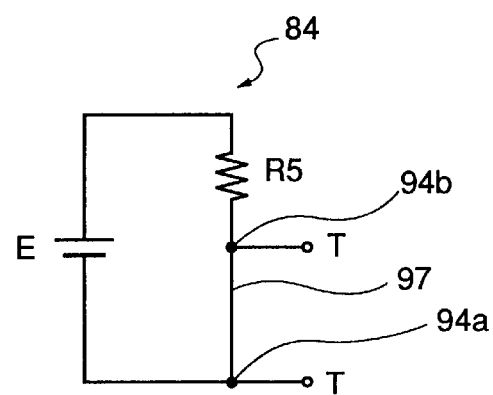
FIG. 11B is a circuit diagram of exposure sensor 84 therein.

FIG. 11B is a circuit diagram of exposure sensor 84 of IC chip module 98. The circuit of exposure sensor 84 of the present embodiment is similar to that shown in FIG. 10B. More specifically, as shown in FIG. 11A, terminals 94a and 94b provided to IC chip 94 are electrically connected together by the strip of interconnection 97 formed on seal member 96.

Seal member 96 normally stuck on an upper surface of IC chip 94 allows conduction between two output terminals Ts, as in IC chip module 92 described above. Thus the voltage across two output terminals Ts has a value no more than a threshold. However, when IC chip module 98 is opened or seal member 96 on the upper surface of IC chip 94 is removed to apply a probe or the like on pad 95, conduction fails between terminals 94a and 94b and the voltage across two output terminals Ts has a value no less than the threshold. As with IC chip module 92 described above, the voltage created across two output terminals Ts that has a value no less than the threshold corresponds to the exposure detection signal. Receiving the exposure detection signal, the CPU is notified that IC chip module 98 is in opened condition.

While in the FIGS. 10A and 11A embodiments, disconnection (non-conduction) of an interconnection is detected to detect that an IC chip module is in opened condition, external light entering when the IC chip module is opened may be detected to detect that the module is in opened condition, as is with IC card 30 described above. Furthermore, a variation in electrostatic capacitance introduced when the IC chip module is opened may be detected to detect that the module is in opened condition, or a variation in resistance introduced when the module is opened may be detected to detect that the module is in opened condition.

When the exposure detection signal is received, the CPU incorporated in IC chip 86 (shown in FIG. 10A) or 94 (shown in FIG. 11A) provides a processing similar to that with IC card 30 described above, e.g., a processing to render the CPU inoperable (FIG. 9).

It should be noted that when a CPU and a non-volatile memory are provided to a single IC chip, as in IC chip module 98 (shown in FIG. 11A), other types of processing can also be provided, such as erasing a portion or the entirety of the data stored in the non-volatile memory (FIG. 7), prohibiting reading a portion or the entirety of the data therein (FIG. 8).

Although in each embodiment above, the present invention is applied to a 1-coil, non-contact IC card, the present invention is also applicable to so-called multi-coil, non-contact IC cards. The present invention is also applicable to contact IC cards. Furthermore, the present invention is generally applicable to IC cards with a IC chip mounted thereto. It should be noted that an IC card referred to herein is a housing body with an IC chip housed therein and may have any shapes and sizes. The housing body includes a box-like member, as well as a generally plate-like member. The present invention is applicable not only to IC cards but also to IC chip modules including a member with an IC chip circuit.

Industrial Applicability

Thus the present invention allows manufacturing an IC card with enhanced security and is thus advantageously applicable to any industries manufacturing and utilizing such IC card.

What is claimed is:

1. An IC card comprising:

an IC chip having a CPU;

a housing body housing said IC chip; and exposure detection means formed at said IC chip, detecting opened condition of said housing body; characterized in that said CPU controls said IC chip to at least partially fail to normally function in response to a signal indicative of the opened condition having been output from said exposure detection means when the CPU receives a power supply voltage to start to operate.

2. The IC card of claim 1, said IC chip including a data storage unit disposed to store data, characterized in that once the opened condition has been detected via said signal output said data storage unit has the data at least partially rendered non-extractable.

3. The IC card of claim 2, characterized in that once the opened condition has been detected via said signal output said data storage unit has the data at least partially prohibited from being read.

4. The IC card of claim 2, characterized in that once the opened condition has been detected via said signal output said data storage unit has the data at least partially erased.

5. The IC card of claim 1, said IC chip including a data processing unit disposed to process data, characterized in that once the opened condition has been detected via said signal output said data processing unit has a function at least partially stopped.

6. The IC card of claim 1, characterized in that said exposure detection means detects the opened condition by detecting external light entering when said housing body is opened.

7. The IC card of claim 6, characterized in that said exposure detection means is a plurality of light receiving elements arranged in parallel.

8. An IC chip module with at least two members integrally formed, at least one of said members being provided with an IC chip having a CPU, comprising exposure detection means formed at said IC chip, detecting opened condition of said IC chip module, characterized in that said CPU controls said IC chip to at least partially fail to normally function in response to a signal indicative of the opened condition having been output from said exposure detection means when the CPU receives a power supply voltage to start to operate.

9. The IC chip module of claim 8, said IC chip including a data storage unit disposed to store data, characterized in that once the opened condition has been detected via said signal output said data storage unit has the data at least partially rendered non-extractable.

10. The IC chip module of claim 9, characterized in that once the opened condition has been detected via said signal output said data storage unit has the data at least prohibited from being read.

11. The IC chip module of claim 9 characterized in that once the opened condition has been detected via said signal output said data storage unit has the data at least partially erased.

12. The IC chip module of claim 8, said IC chip including a data processing unit disposed to process data, characterized in that once the opened condition has been detected via said signal output said data processing unit has a function at least partially stopped.

13. The IC chip module of claim 8, characterized in that said exposure detection means detects the opened condition by detecting external light entering when said IC chip module is opened.

14. The IC chip module of claim 13, characterized in that said exposure detection means is a plurality of light receiving elements arranged in parallel.

* * * * *